(12) United States Patent
Yoshida

(10) Patent No.: US 7,142,770 B2
(45) Date of Patent: Nov. 28, 2006

(54) ELECTROOPTIC DEVICE AND PRODUCTION METHOD THEREFOR

(75) Inventor: Toshiaki Yoshida, Chino (JP)

(73) Assignee: Seiko Epson Corporation, Tokyo (JP)

( * ) Notice: Subject to any disclaimer, the term of this patent is extended or adjusted under 35 U.S.C. 154(b) by 605 days.

(21) Appl. No.: 10/233,401

(22) Filed: Sep. 4, 2002

(65) Prior Publication Data

US 2003/0053791 A1    Mar. 20, 2003

(30) Foreign Application Priority Data

Sep. 20, 2001    (JP)    ............................ 2001-287399

(51) Int. Cl.
*G02B 6/00* (2006.01)
(52) U.S. Cl. ...................... 385/147; 313/505; 313/506; 235/454
(58) Field of Classification Search ................ 313/505, 313/506; 385/147; 235/454
See application file for complete search history.

(56) References Cited

U.S. PATENT DOCUMENTS

| 5,764,324 | A | 6/1998 | Lu et al. | |
| 6,195,140 | B1 | 2/2001 | Kubo et al. | |
| 6,215,538 | B1 | 4/2001 | Narutaki et al. | |
| 2001/0020991 | A1 | 9/2001 | Kubo et al. | |
| 2004/0259453 | A1* | 12/2004 | Fukunaga et al. | ............ 445/24 |
| 2005/0052598 | A1* | 3/2005 | Ichimura | .................... 349/113 |

FOREIGN PATENT DOCUMENTS

| EP | 1 074 874 A1 | 2/2001 |
| EP | 1 158 344 A2 | 11/2001 |
| JP | 10-206845 A | 8/1998 |
| JP | A 10-301142 | 11/1998 |
| JP | A-10-325953 | 12/1998 |
| JP | 11-101992 A | 4/1999 |
| JP | 11-109417 A | 4/1999 |
| JP | 2002-229016 A | 8/2002 |
| JP | 2002-341342 A | 11/2002 |
| JP | 2002-357848 A | 12/2002 |
| KR | A-2001-0011905 | 2/2001 |
| KR | A-2001-0025955 | 4/2001 |

* cited by examiner

*Primary Examiner*—Karl D. Frech
(74) *Attorney, Agent, or Firm*—Oliff & Berridge, PLC

(57) ABSTRACT

The invention provides an electrooptic device which is suitable for use in a portable telephone, a mobile computer, and the like, and in which the effective voltage to be applied to the liquid crystal is high, high-contrast display is possible, and a reflective electrode is prevented from deteriorating. The invention also provides a production method for the electrooptic device. An electrooptic device includes a pair of substrates opposing each other so as to seal and hold liquid crystal therebetween, and a reflective plate that is formed on the side of one of the substrates close to the liquid crystal and that has one or more openings, each at a predetermined position, to reflect incident light from the other substrate and to transmit light from a backlight source. A transparent electrode is formed on the reflective plate, and is electrically connected to a drain electrode or a semiconductor layer.

12 Claims, 14 Drawing Sheets

FIG. 7
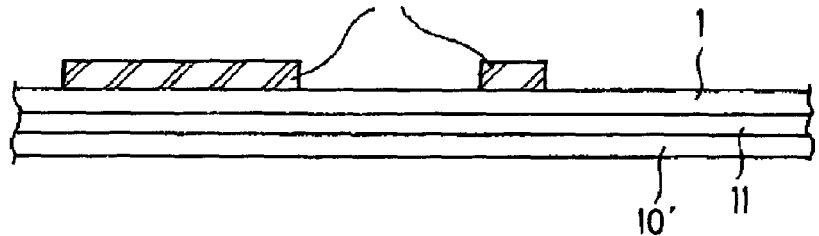
(A)
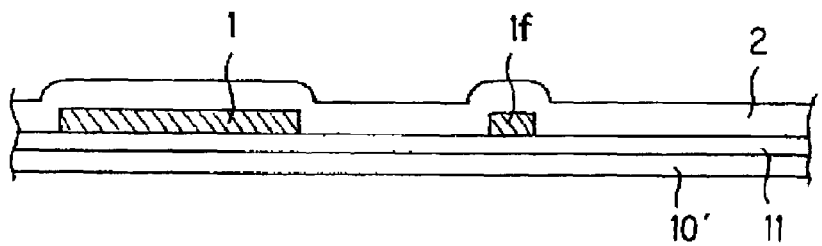
(B)
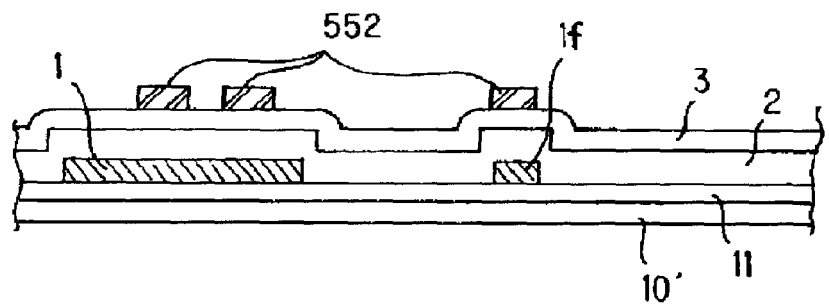
(C)
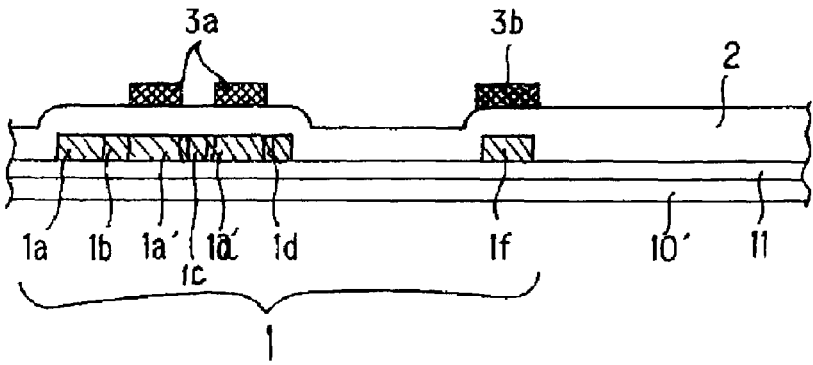
(D)

FIG. 9
(A) 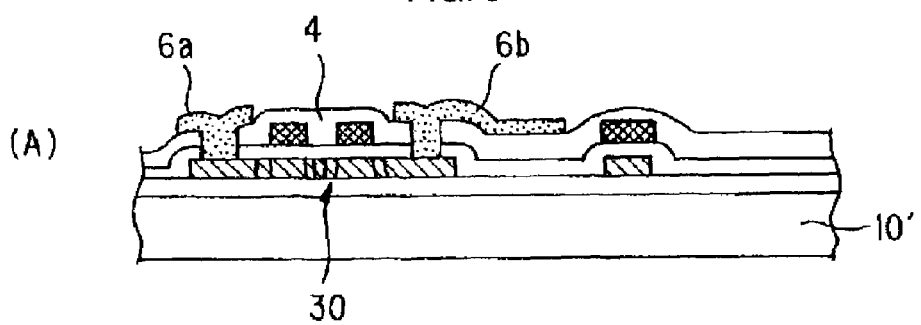
(B) 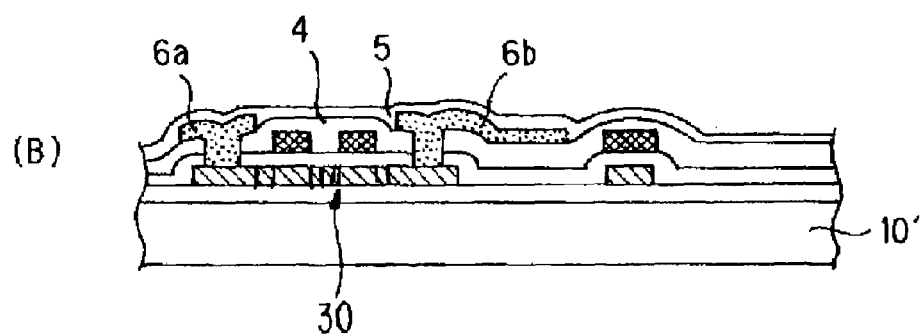

ELECTROOPTIC DEVICE AND PRODUCTION METHOD THEREFOR

BACKGROUND OF THE INVENTION

1. Field of Invention

The present invention relates to an electrooptic device and a production method therefor. More particularly, the present invention relates to an electrooptic device which is suitable for use in a portable telephone, a mobile computer, and the like, and in which the effective voltage to be applied to liquid crystal is high, high-contrast display is possible, and a reflective electrode and a reflective plate are prevented from deteriorating. The invention also relates to a production method for the electrooptic device.

2. Description of Related Art

Electrooptic devices (for example, liquid crystal display devices and EL light-emitting display devices) are widely used as direct-view display devices in various electronic devices, such as portable telephones and mobile computers. For example, in an active matrix semi-transmissive and semi-reflective liquid crystal display device of such electrooptic devices, a TFT array substrate and a counter substrate opposing each other are bonded with a sealing material, and liquid crystal serving as an electrooptic substance is sealed and held between the substrates in a region defined by the sealing material.

A reflective plate is formed on the surface of the TFT array substrate so as to reflect external light incident from the counter substrate side back toward the counter substrate, light incident from the counter substrate is reflected by the reflective plate of the TFT array substrate, and an image is displayed with the light emitted from the counter substrate (reflection mode). The reflective plate has an opening to transmit light, a transparent electrode is formed under the reflective plate so as to cover the opening, and an image is displayed with light from a backlight passing through the opening (transmissive mode).

A TFT array substrate 120 used in such a liquid crystal display device is, as shown in FIG. 15, formed, for example, by stacking, on a substrate 101, a protective underlayer 102 made of a silicon oxide film ($SiO_2$ film) or the like, a switching element made of a thin-film transistor (TFT) 103 or the like, a gate insulating film 103a, a source line 104, an interlayer insulating film 105, a protective film 105a made of a silicon nitride film (the protective film 105a is sometimes not formed), two layers made of organic photosensitive resin, such as acrylic resin, to form surface irregularities for reflection under a transparent electrode 108, which will be described below, that is, a surface-irregularities forming layer 106 and an uneven layer 107, a transparent electrode 108 made of an ITO (Indium Tin Oxide) film, and a reflective plate 109 made of a single film of aluminum, silver, or an alloy thereof, or a composite film formed of the metal or alloy, and titanium, titanium nitride, molybdenum, or tantalum. The source line 104 and the transparent electrode 108 are electrically connected by a contact hole 110 formed through the uneven layer 107. On the other hand, in a counter substrate 130, a transparent electrode 132 made of an ITO (Indium Tin Oxide) film is formed on a substrate 131. Alignment films 111 and 133 are formed on the surfaces of the TFT array substrate 120 and the counter substrate 130 in which they face liquid crystal 50.

SUMMARY OF THE INVENTION

In the liquid crystal display device having such a configuration, however, since a voltage applied to the liquid crystal 50 between the transparent electrode 132 and the reflective plate 109 via the transparent electrode 108 drops at the reflective plate 109, the effective voltage also drops, and therefore, the display contrast decreases. Moreover, since the reflective plate 109 is exposed in a bare state at the side opposing the liquid crystal, the metal film forming the reflective plate 109 is prone to deterioration.

The present invention addresses the above problems, and provides an electrooptic device which is suitable for use in a portable telephone, a mobile computer, and the like, and in which the effective voltage to be applied to the liquid crystal is high, high-contrast display is possible, and a reflective electrode is prevented from deteriorating. The invention also provides a production method for the electrooptic device.

An electrooptic device of the present invention includes a pair of substrates opposing each other so as to seal and hold an electrooptic substance therebetween, and a reflective plate formed on the side of one of the pair of substrates close to the electrooptic substance, and having one or more openings, each at a predetermined position, to reflect incident light from the other one of the substrates, and to transmit light from a backlight source. A transparent electrode is formed on the reflective plate and is electrically connected to a drain electrode or a semiconductor layer.

Such a configuration makes it possible to increase the effective voltage to be applied to the liquid crystal in order to produce a higher-contrast display, and to prevent the reflective plate from deteriorating or reduce such deterioration.

The electrooptic device of the present invention may include a pair of substrates opposing each other so as to seal and hold an electrooptic substance therebetween, and a reflective plate formed on the side of one of the pair of substrates close to the electrooptic substance, and having one or more openings, each at a predetermined position, to reflect incident light from the other one of the substrates, and to transmit light from a backlight source. A transparent electrode is formed on the reflective plate, and said reflective plate is a reflective electrode electrically connected to a drain electrode or a semiconductor layer.

Such a configuration can prevent the reflective plate from deteriorating or reduce such deterioration.

In this case, preferably, the reflective plate is made of a single film of aluminum, silver, or an alloy containing at least one of aluminum and silver, or a composite film formed of the metal or alloy, and titanium, titanium nitride, molybdenum, tantalum, or the like. Furthermore, preferably, the transparent electrode is made of an ITO (Indium Tin Oxide) film.

This can increase the light reflection efficiency.

Preferably, the transparent electrode is made of an ITO (Indium Tin Oxide) film.

This can increase the display contrast in a transmissive mode.

Preferably, the area in which the transparent electrode is formed is wider than the area in which the reflective plate is formed.

This can prevent the reflective plate from deteriorating or reduce such deterioration.

Preferably, the electrooptic device further includes an uneven layer formed under the reflective plate and the transparent electrode, and having surface irregularities, and the reflective plate has an uneven surface that conforms to the irregularities of the uneven layer so as to scatter reflected light.

This can enhance the reflection characteristics.

An electrooptic device production method of the present invention includes the steps of forming a reflective plate on the side of one of a pair of substrates opposing each other so as to seal and hold an electrooptic substance therebetween, the side being close to the electrooptic substance, forming one or more openings, each at a predetermined position in the reflective plate, to reflect incident light from the other one of the pair of substrates and to transmit light from a backlight source, forming a transparent electrode on the reflective plate so as to cover an area of the reflective plate corresponding to the openings, and electrically connecting the transparent electrode to a drain electrode or a semiconductor layer.

This makes it possible to efficiently and cheaply produce an electrooptic device in which the effective voltage to be applied to the liquid crystal is high, high-contrast display is possible, and deterioration of the reflective plate is prevented or reduced.

The electrooptic device production method of the present invention includes the steps of forming a reflective plate on a side of one of a pair of substrates opposing each other so as to seal and hold an electrooptic substance therebetween, the side being close to the electrooptic substance, forming one or more openings, each at a predetermined position in the reflective plate, to reflect incident light from the other one of the pair of substrates and to transmit light from a backlight source, electrically connecting the reflective plate to a drain electrode or a semiconductor layer so as to form a reflective electrode, and forming a transparent electrode on the reflective electrode so as to cover an area of the reflective electrode corresponding to the openings.

This makes it possible to efficiently and cheaply produce an electrooptic device in which deterioration of the reflective electrode is prevented or reduced.

In this case, preferably, a single film of aluminum, silver, or an alloy containing at least one of aluminum and silver, or a composite film formed of the metal or alloy, and titanium, titanium nitride, molybdenum, tantalum, or the like is used as the reflective electrode.

This makes it possible to efficiently and cheaply produce an electrooptic device having an increased light reflection efficiency.

Preferably, an ITO (Indium Tin Oxide) film is used as the transparent electrode.

This makes it possible to efficiently and cheaply produce an electrooptic device having an increased display contrast in a transmissive mode.

Preferably, the area in which the transparent electrode is formed is wider than the area in which the reflective electrode is formed in the step of forming the transparent electrode.

This makes it possible to efficiently and cheaply produce an electrooptic device, in which deterioration of the reflective electrode is prevented or reduced.

Preferably, the production method further includes a step of forming an uneven layer having surface irregularities on the one substrate before the step of forming the reflective electrode.

This makes it possible to efficiently and cheaply produce an electrooptic device having an enhanced reflection characteristic.

BRIEF DESCRIPTION OF THE DRAWINGS

FIGS. 7(A) to 7(D) are sectional views sequentially showing the processes to produce a TFT array substrate in an electrooptic device production method according to an embodiment of the present invention;

FIGS. 9(A) and 9(B) are sectional views sequentially showing the processes to produce the TFT array substrate subsequent to the processes shown in FIGS. 8(A) to 8(D);

DETAILED DESCRIPTION OF PREFERRED EMBODIMENTS

An electrooptic device and a production method therefor according to an embodiment of the present invention will be specifically described below with reference to the drawings.

Basic Configuration of Electrooptic Device

Figure 1:
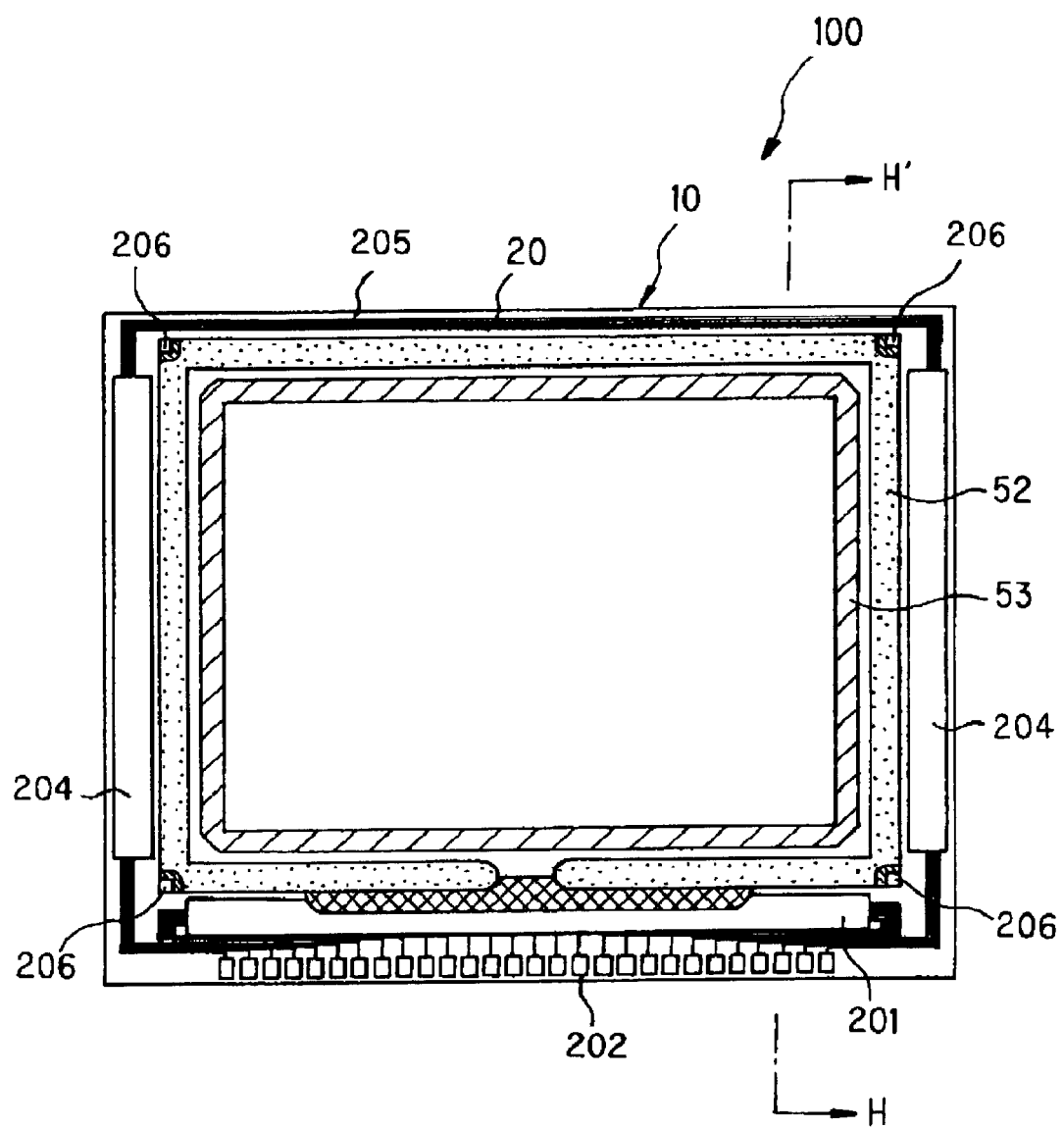
FIG. 1 is a plan view of an electrooptic device according to an embodiment of the present invention, as viewed from the side of a counter substrate.
Figure 2:
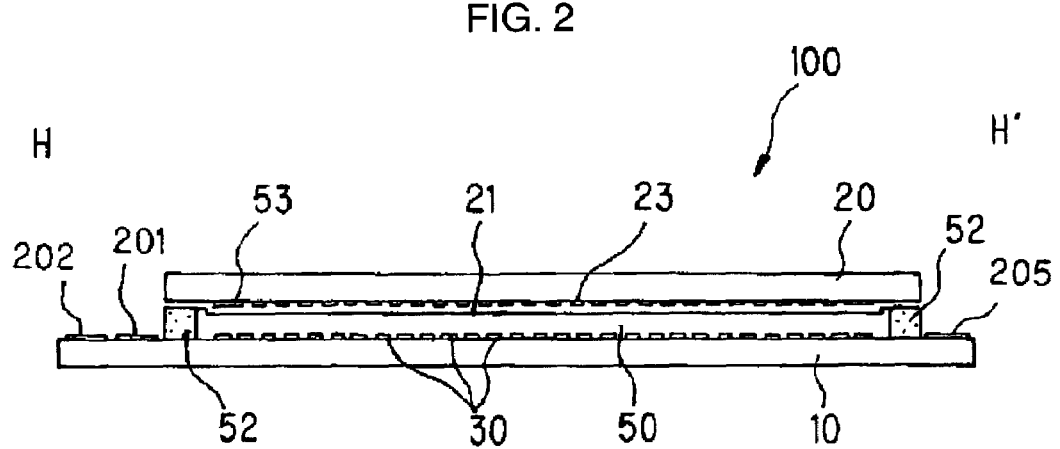
FIG. 2 is a sectional view taken along plane H–H' in FIG. 1.
Figure 3:
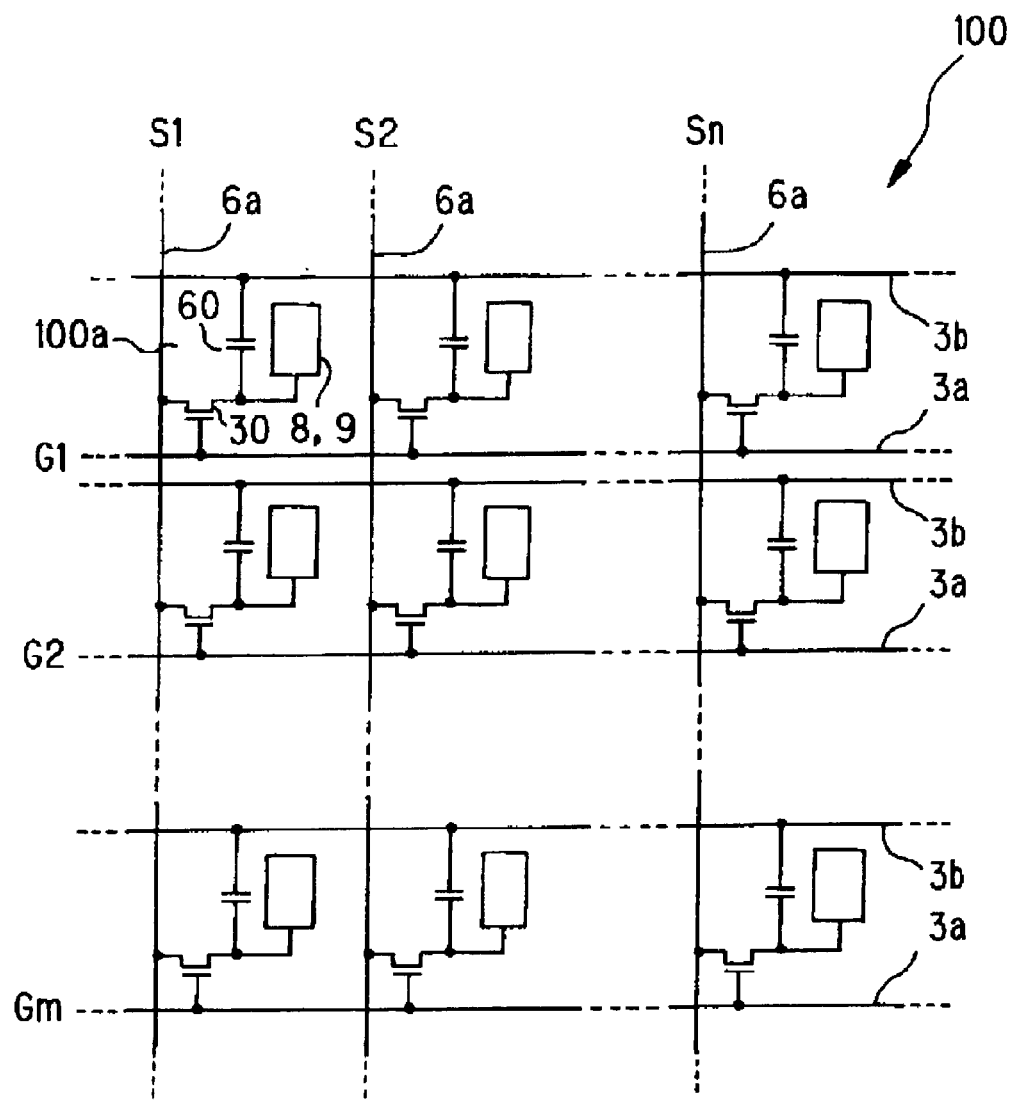
FIG. 3 is an equivalent circuit diagram showing elements, lines, and the like formed in a plurality of pixels arranged in a matrix in the electrooptic device according to the embodiment of the present invention.

FIG. 1 is a plan view of a liquid crystal display device with components as an electrooptic device according to an embodiment of the present invention, as viewed from the side of a counter substrate, and FIG. 2 is a sectional view taken along plane H–H' in FIG. 1. FIG. 3 is an equivalent circuit diagram showing elements, lines, and the like in a plurality of pixels formed in a matrix in an image display region of the electrooptic device (liquid crystal display device). In the drawings used to describe this embodiment, layers and members are shown in different scales so as to enhance their viewability.

In FIGS. 1 and 2, in an electrooptic device (liquid crystal display device) 100 of this embodiment, a TFT array substrate 10 (first substrate) and a counter substrate 20 (second substrate) are bonded with a sealing material 52, and liquid crystal 50 serving as an electrooptic substance is sealed and held in a region defined by the sealing material 52 (liquid-crystal sealed region). A light-shielding layer 53 to enclose an image display region is made of a light-shielding material inside an area in which the sealing material 52 is formed. A data-line driving circuit 201 and leads 202 are formed along one side of the TFT array substrate 10 outside of the sealing material 52, and scanning-line driving circuits 204 are formed along two sides next to the side. A plurality of wires 205 to connect the scanning-line driving circuits 204 disposed on both sides of the image display region are formed on the remaining side of the TFT array substrate 10, and a precharge circuit and a detection circuit are sometimes formed, for example, under the light-shielding layer 53. A conductive material 206 is placed at at least one corner of the counter substrate 20 so as to electrically connect the TFT array substrate 10 and the counter substrate 20.

Instead of forming the data-line driving circuit 201 and the scanning line driving circuits 204 on the TFT array substrate 10, for example, a TAB (tape automated bonding) substrate on which a driving LSI is mounted, and a group of terminals formed on the periphery of the TFT array substrate 10 may be electrically and mechanically connected by an anisotropic conductive film. While a polarizing film, a retardation film, a polarizer, and the like are placed in predetermined orientations in the electrooptic device 100, depending on the type of the liquid crystal 50 to be used, that is, depending on the driving mode, such as a TN (twisted nematic) mode or an STN (super TN) mode, and a normally white mode/a normally black mode, they are not shown.

When the electrooptic device 100 is adapted to color display, for example, red (R), green (G), and blue (B) color filters and protective films therefor are formed in regions of the counter substrate 20 opposing pixel electrodes of the TFT array substrate 10 which will be described below.

In the image display region of the electrooptic device 100 having such a configuration, as shown in FIG. 3, a plurality of pixels 100a are arranged in a matrix, the pixels 100a are provided with TFTs 30 for pixel switching, respectively, and data lines 6a to supply pixel signals S1, S2, . . . , and Sn are electrically connected to sources of the corresponding TFTs 30. The pixel signals S1, S2, . . . , and Sn to be written in the data lines 6a may be supplied in that order in a line-sequential manner (in the order of line number), and every group of the pixel signals may be supplied to a plurality of adjoining data lines 6a. Scanning lines 3a are electrically connected to gates of the corresponding TFTs 30 so that scan signals G1, G2, . . . , and Gm are applied to the scanning lines 3a in that order in a line-sequential manner (in the order of line number) at a predetermined timing and in a pulsed form. Reflective electrodes 8 and transparent electrodes 9 are electrically connected to drains of the corresponding TFTs 30, and the pixel signals S1, S2, . . . , and Sn supplied from the data lines 6a are written in the corresponding pixels at a predetermined timing by activating the TFTs 30 serving as the switching elements for a predetermined period. The pixel signals S1, S2, . . . , and Sn at a predetermined level that are thus written in the liquid crystal via the reflective electrodes 8 and the transparent electrodes 9 are held between the reflective electrode 8 and the transparent electrode 9, and counter electrodes 21 of the counter substrate 20 shown in FIG. 2 for a predetermined period.

In the liquid crystal 50, the orientation and order of an aggregation of molecules change depending on the level of a voltage applied thereto, thereby modulating light and enabling grayscale display. The amount of incident light passing through the liquid crystal 50 decreases depending on the applied voltage in a normally white mode, and the amount of incident light passing through the liquid crystal 50 increases depending on the applied voltage in a normally black mode. As a result, light having a contrast in accordance with the pixel signals S1, S2, . . . , and Sn is emitted from the electrooptic device 100 as a whole.

In order to prevent the held pixel signals S1, S2, . . . , and Sn from leaking, storage capacitors 60 (see FIG. 3) are sometimes added in parallel with liquid crystal capacitance formed between the transparent electrodes (pixel electrodes) 9 and the counter electrodes 21. For example, the voltage of the transparent electrode 9 is held in the storage capacitor 60 for a time three orders of magnitude longer than the time during which the source voltage is applied. This enhances the charge retention characteristics, and allows the electrooptic device 100 to achieve a high contrast. The storage capacitor 60 may be formed between the data line 6a and a capacitor line 3b serving as a line to form the storage capacitor 60, as shown in FIG. 3, or between the data line 6a and the above-described scanning lines 3a.

Configuration of TFT Array Substrate

Figure 4:
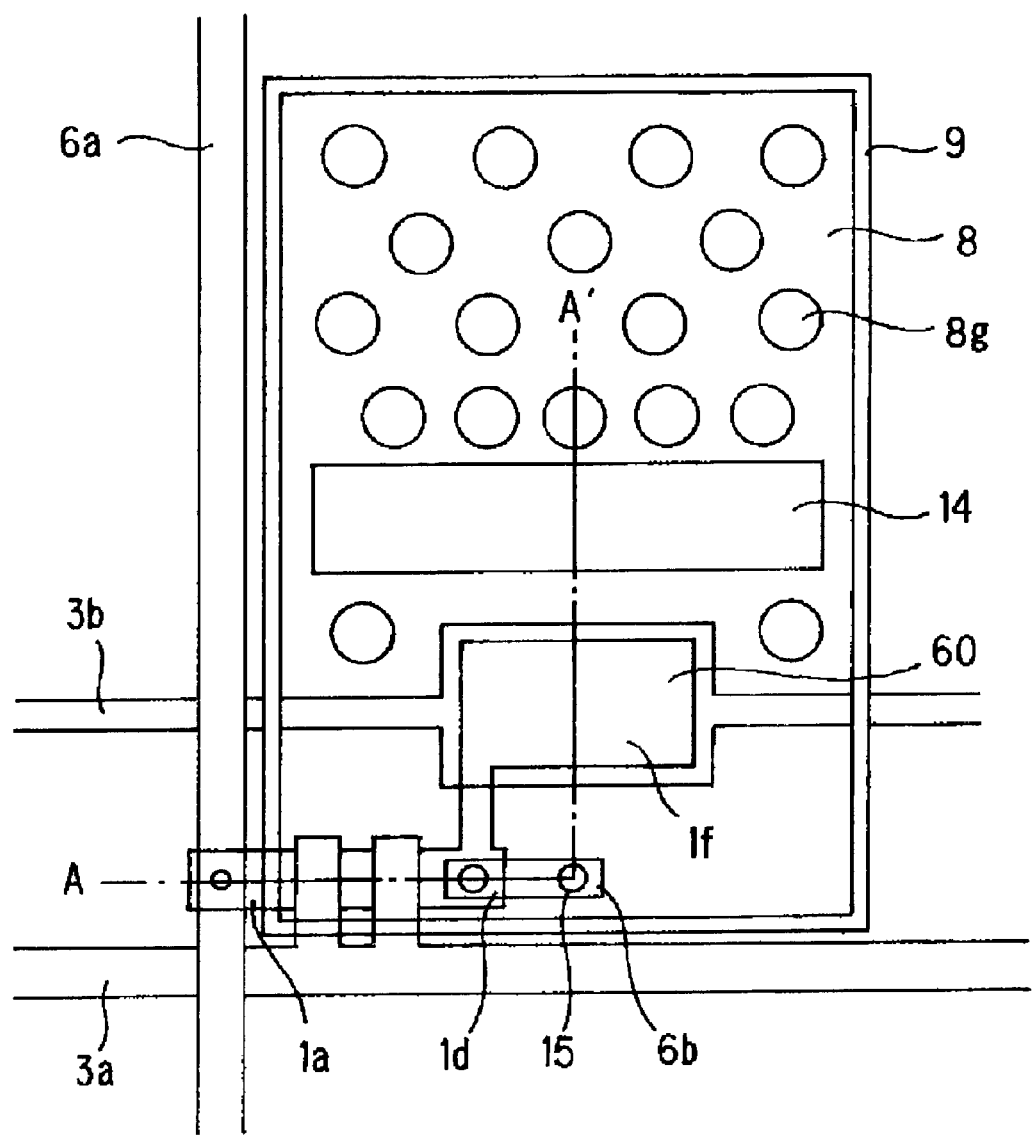
FIG. 4 is a plan view showing the structure of each pixel formed in a TFT array substrate in the electrooptic device according to the embodiment of the present invention.
Figure 5:
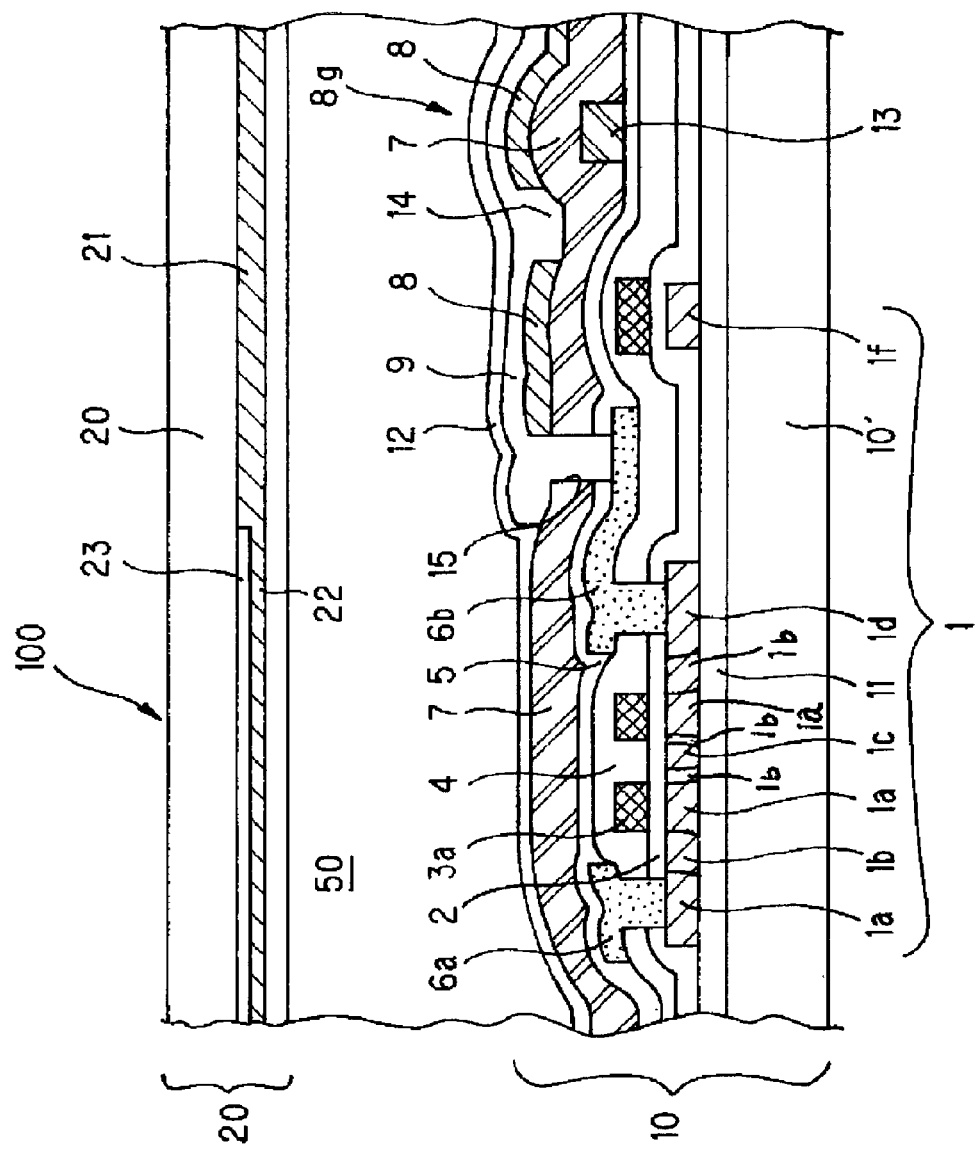
FIG. 5 is a sectional view of the pixel taken along plane A–A' in FIG. 4.

FIG. 4 is a plan view of one pixel in the TFT array substrate 10 used in this embodiment. FIG. 5 is a sectional view of the pixel in the electrooptic device shown in FIG. 4 taken along plane A–A' in FIG. 4.

In FIG. 4, a transparent electrode 9 is formed on each of reflective plates 8 that are arranged in a matrix on the TFT array substrate 10 and are made of a single film of aluminum or an aluminum alloy, or a composite film formed of the metal or alloy, and titanium, titanium nitride, molybdenum, tantalum, or the like. The transparent electrode 9 is electrically connected to a drain electrode 6b of a TFT 30 for pixel switching. A data line 6a, a scanning line 3a, and a capacitor line 3b are formed along the lengthwise and breadthwise boundaries between the areas in which the reflective plates 8 are formed, and the TFT 30 is connected to the data line 6a and the scanning line 3a. That is, the data line 6a is electrically connected to a heavily doped source region 1a of a semiconductor film 1 of the TFT 30 via a contact hole, and the transparent electrode 9 is electrically connected to a heavily doped drain region 1d of the semiconductor film 1 of the TFT 30.

As shown in FIG. 4, in each pixel 100a having such a structure, an area in which an opening 14 is formed, of a region in which the reflective plate 8 is formed, serves as a transmissive area covered with the transparent electrode 9 and used to perform image display in a transmissive mode, and the other area serves as a reflective area having the reflective plate 8 and used to perform image display in a reflective mode.

In the cross section of the reflection area taken along plane A–A' in FIG. 4, as shown in FIG. 5, a protective underlayer 11 made of a silicon oxide film (insulating film) of 300 nm to 500 nm in thickness is formed on the surface of a transparent substrate 10' serving as a base of the TFT array substrate 10, and an island-shaped semiconductor film 1 of 30 nm to 100 nm in thickness is formed on the surface of the protective underlayer 11. A gate insulating film 2 made of a silicon oxide film having a thickness of approximately 50 nm to 150 nm is formed on the surface of the semiconductor film 1, and a scanning line 3a of 300 nm to 800 nm in thickness extends as a gate electrode on the surface of the gate insulating film 2. An area of the semiconductor film 1 opposing the scanning line 3a with the gate insulating film 2 therebetween serves as a channel-forming region 1a'. A source region including a lightly doped region 1b and the heavily doped source region 1a is formed on one side of the channel-forming region 1a', and a drain region including a lightly doped region 1b and the heavily doped drain region 1d is formed on the other side. Reference numeral 1c in FIG. 5 denotes a heavily doped region.

A first interlayer insulating film 4 made of a silicon oxide film having a thickness of 300 nm to 800 nm is formed on the front side of the TFT 30 for pixel switching. The data line 6a of 300 nm to 800 nm in thickness is formed on the surface of the first interlayer insulating film 4, and is electrically connected to the heavily doped source region 1a via a contact hole formed in the first interlayer insulating film 4. A drain electrode 6b is formed simultaneously with the data line 6a on the surface of the first interlayer insulating film 4, and is electrically connected to the heavily doped drain region 1d via a contact hole formed in the first interlayer insulating film 4.

A second interlayer insulating film (surface-protecting film) 5 is formed of, for example, a single silicon nitride film or silicon oxide film, or two films composed of a silicon nitride film and a silicon oxide film on the first interlayer insulating film 4 (the second interlayer insulating film (surface-protecting film) 5 may be omitted). A surface-irregularities forming layer 13 and an uneven layer 7 made of a photosensitive resin, such as organic resin, are formed in that order on the second interlayer insulating film (surface-protecting film) 5, and a reflective plate 8 made of an aluminum film or the like having a transmission opening 14 is formed on the surface of the uneven layer 7. An uneven pattern 8g which conforms to the uneven surface of the uneven layer 7 is formed on the surface of the reflective plate 8.

A transparent electrode 9 of approximately 50 nm to 200 nm in thickness is formed of a stack of ITO films on the reflective plate 8, and is electrically connected to the drain electrode 6b via a contact hole 15.

An alignment film 12 is formed of a polyimide film on the front side of the transparent electrode 9. The alignment film 12 is subjected to rubbing.

A capacitor line 3b which is formed in the same layer as the scanning line 3a opposes, as an upper electrode, an extended portion 1f (lower electrode) extending from the heavily doped drain region 1d with an insulating film (dielectric film), which is formed simultaneously with the gate insulating film 2, therebetween, thereby constituting a storage capacitor 60.

While it is preferable that the TFT 30 have the above-described LDD structure, it may have an offset structure in which impurity ions are not implanted in the regions corresponding to the lightly doped source region 1b and the lightly doped drain region 1c. Alternatively, the TFT 30 may be of a self-aligned type in which high-concentration impurity ions are implanted by using the gate electrode (part of the scanning line 3a) as a mask, and heavily doped source and drain regions are formed in a self-aligned manner.

While this embodiment adopts a dual gate (double gate) structure in which two gate electrodes (scanning line 3a) of the TFT 30 are placed in the source-drain region, it may adopt a single gate structure having one gate electrode, a triple gate structure, or a structure in which more than three gate electrodes are placed. When a plurality of gate electrodes are provided, the same signal is applied to each gate electrode. By thus providing the TFT 30 with the dual gate (double gate) structure, the triple gate structure, or the structure having more gates, a leakage current can be avoided at a joint portion between the channel and the source-drain region, and the current in an OFF state can be reduced. By providing at least one of the gate electrodes with an LDD structure or an offset structure, the OFF current can be further reduced, and this can achieve a stable switching element.

In FIGS. 4 and 5, the uneven pattern 8g is formed in a region on the surface of the reflective plate 8 outside the region where the TFT 30 and the opening 14 are formed in the reflection region of each pixel 100a of the TFT array substrate 10 (reflective electrode forming region), as described above.

In order to form such an uneven pattern 8g in the TFT array substrate 10 of this embodiment, the surface-irregularities forming layer 13 made of an organic photosensitive resin, such as acrylic resin, and having a thickness of 1 µm to 3 µm is formed, for example, by spin coating, on the surface of the second interlayer insulating film 5 in a region that two-dimensionally overlaps with the reflective plate 8 on the lower side of the reflective plate 8, and the uneven layer 7 of 1 µm to 2 µm in thickness is formed of an insulating film made of a fluid, such as an organic photosensitive resin, for example, acrylic resin, on the surface-irregularities forming layer 13, for example, by spin coating.

The surface-irregularities forming layer 13 has multiple irregularities. For this reason, as shown in FIG. 5, the uneven pattern 8g is formed on the surface of the reflective plate 8 so as to conform to the uneven surface of the uneven layer 7, and the edges of the surface-irregularities forming layer 13 are prevented by the uneven layer 7 from being exposed at the uneven pattern 8g. The edges of the irregularities of the surface-irregularities forming layer 13 may be smoothened by forming the surface-irregularities forming layer 13 and then performing baking without forming the uneven layer 7.

Structure of Counter Substrate

In FIG. 5, a light-shielding film 23, which is called a black matrix or a black stripe, is formed in regions of the counter substrate 20 opposing the lengthwise and breadthwise boundaries of the transparent electrodes 9 formed in the TFT array substrate 10, and a counter electrode 21 is formed of an ITO film thereon. An alignment film 22 is formed of a polyimide film on the counter electrode 21. Liquid crystal 50 is sealed and held between the TFT array substrate 10 and the counter substrate 20.

Operation of Electrooptic Device of the Embodiment

Since the reflective electrodes 8 are formed of an aluminum film or the like in the electrooptic device 100 having such a configuration (see FIG. 1), light incident from the side of the counter substrate 20 can be reflected by the TFT array substrate 10 and can be emitted from the counter substrate 20. Therefore, a predetermined image can be displayed with external light by performing optical modulation with the liquid crystal 50 in every pixel 100a during this process (reflection mode).

Since the reflective electrodes 8 are formed so as not to touch the openings 14 shown in FIG. 4, the electrooptic device 100 can also function as a transmissive liquid crystal display device.

That is, light emitted from a backlight device (not shown) placed on the side of the TFT array substrate 10 enters the TFT array substrate 10, and then travels toward the counter substrate 20 after passing through the transmissive area that does not have the reflective electrode 8 (the opening 14 covered with the transparent electrode 9) in the region of each pixel 100*a* (see FIG. 3) in which the reflective plate 8 is formed. For this reason, a predetermined image can be displayed with the light emitted from the backlight device by performing optical modulation with the liquid crystal 50 in every pixel 100*a* (transmission mode).

In this embodiment, the surface-irregularities forming layer 13 is formed on the lower side of the reflective plate 8 so as to two-dimensionally overlap with the reflective plate 8, and the uneven pattern 8*g* to perform light scattering is formed on the surface of the reflective plate 8 by using the irregularities of the surface-irregularities forming layer 13. The edges of the surface-irregularities forming layer 13 or the like are prevented by the uneven layer 7 from being exposed in the uneven pattern 8*g*. Therefore, when an image is displayed with scattered and reflected light in the reflection mode, the dependency on the angle of view is low.

Since the surface of the reflective plate 8 is covered with the transparent electrode 9, the reflective plate 8 can be prevented from deteriorating.

While the transparent electrode and the drain electrode (source line) are electrically connected in this embodiment, the transparent electrode and the semiconductor layer may be electrically connected.

Figure 6:
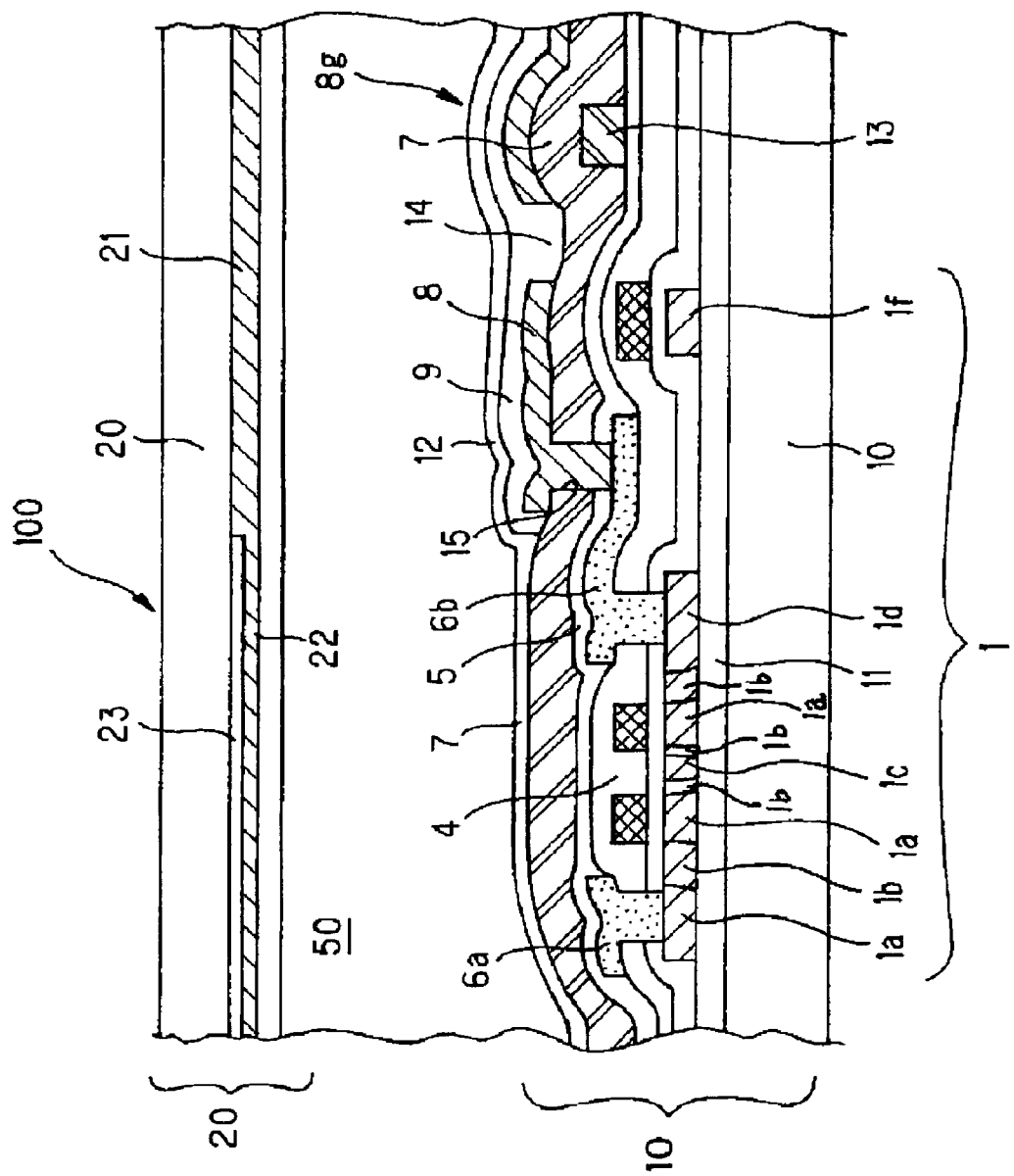
FIG. 6 is a sectional view showing the structure of each pixel formed in a TFT array substrate in an electrooptic device according to another embodiment of the present invention.
Figure 8:
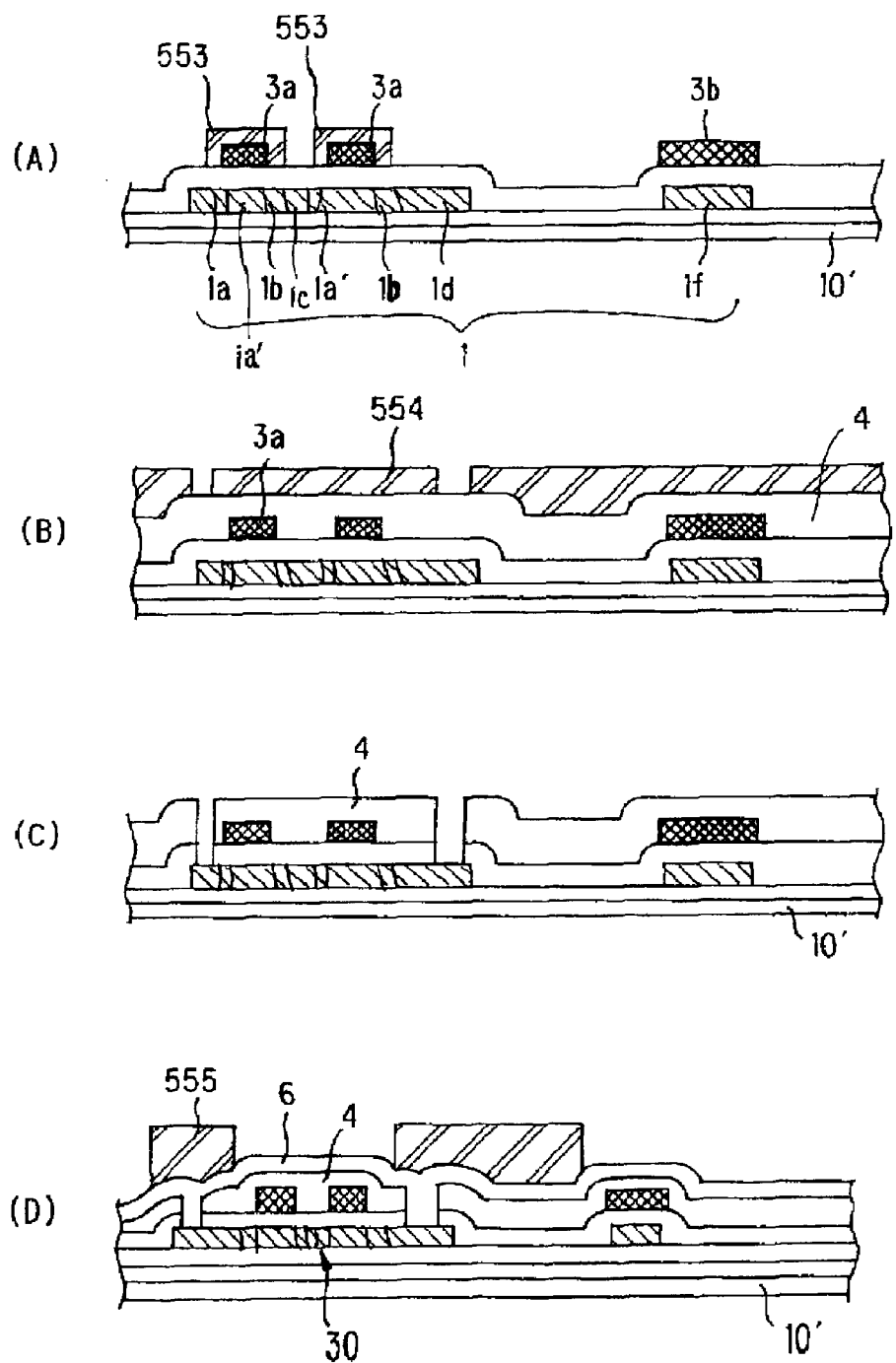
FIGS. 8(A) to 8(D) are sectional views sequentially showing the processes to produce the TFT array substrate subsequent to the processes shown in FIGS. 7(A) to 7(D)
Figure 10:
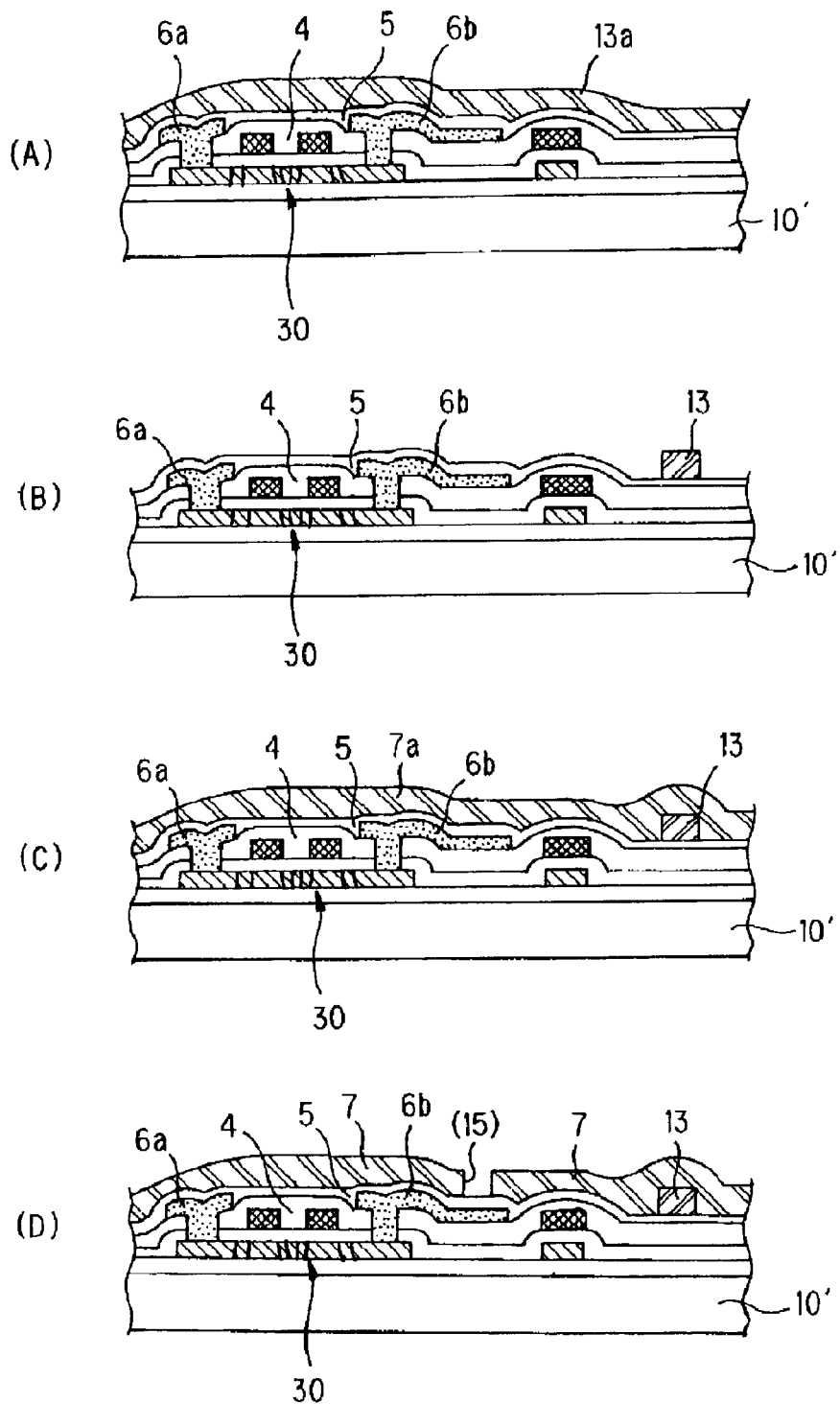
FIGS. 10(A) to 10(D) are sectional views sequentially showing the processes to produce the TFT array substrate subsequent to the processes shown in FIGS. 9(A) and 9(B)
Figure 11:
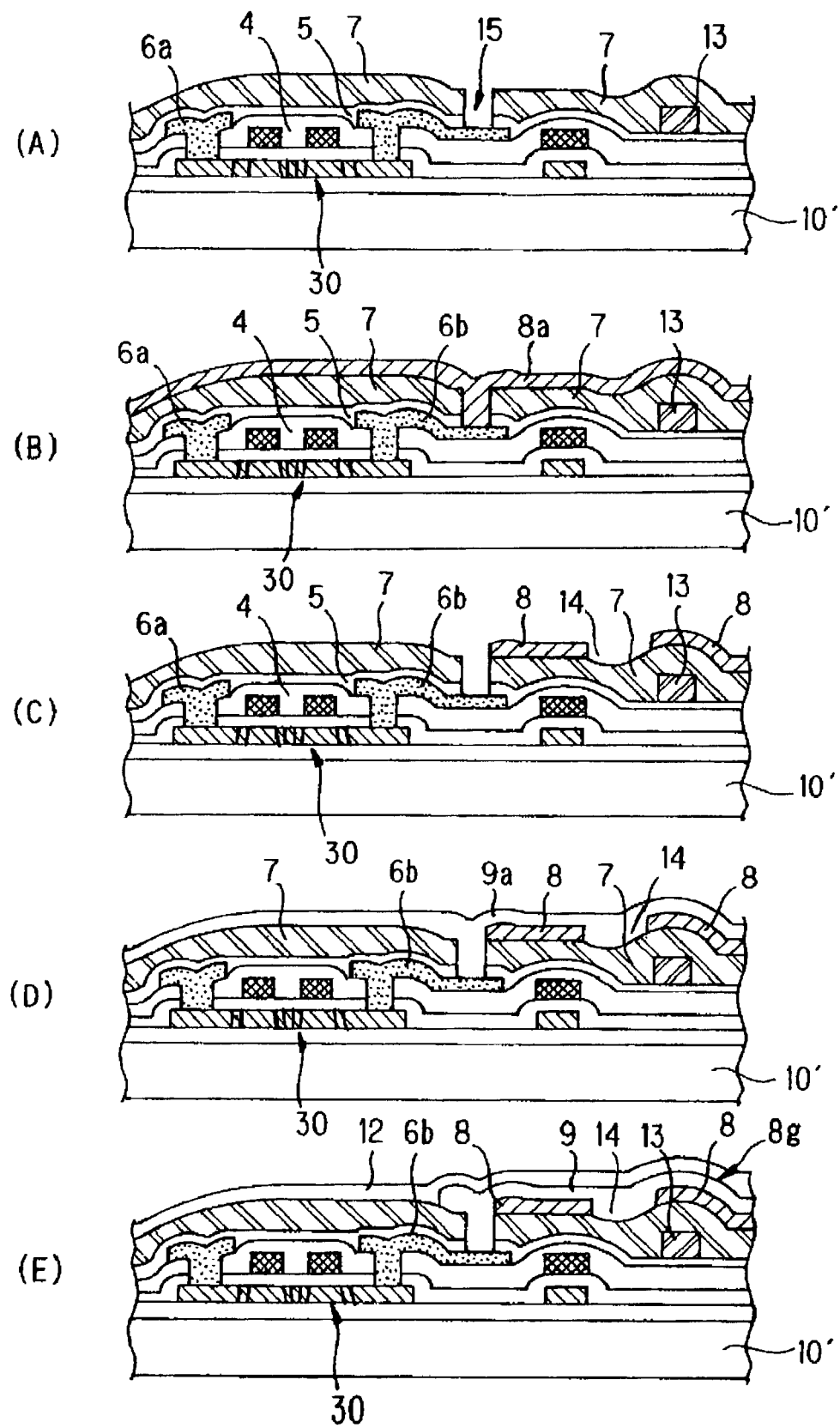
FIGS. 11(A) to 11(E) are sectional views sequentially showing the processes to produce the TFT array substrate subsequent to the processes shown in FIGS. 10(A) to 10(D)

FIG. 6 is a sectional view schematically showing a liquid crystal display device as an electrooptic device according to another embodiment of the present invention. The liquid crystal display device shown in FIG. 6 is different from the liquid crystal display device shown in FIG. 5 in that a drain electrode 6*b* is not electrically connected to a transparent electrode 9, but is electrically connected to a reflective electrode 8'. Since the surface of the reflective electrode 8' is also covered with the transparent electrode 9 in this case, the reflective electrode 8' can be prevented from deteriorating.

While the reflective electrode and the drain electrode (source line) are also electrically connected in this embodiment, the reflective electrode and a semiconductor layer may be connected electrically.

Production Method for TFT

A method for producing the TFT array substrate 10 having such a configuration will be specifically described with reference to FIGS. 7(A) to 11(E).

FIGS. 7(A) to 11(E) are sectional views sequentially showing the processes of the method for producing the TFT array substrate of this embodiment.

First, as shown in FIG. 7(A), a substrate 10' made of glass or the like that is cleaned, for example, by ultrasonic cleaning is prepared, and a protective underlayer 11 made of a silicon oxide film and having a thickness of 100 nm to 500 nm is formed on the entire surface of the substrate 10' by plasma CVD under conditions where the substrate temperature is 150° C. to 450° C. Material gases used in this case are, for example, a mixture of monosilane and laughing gas (nitrous oxide), a mixture of TEOS (tetraethoxysilane: $Si(OC_2H_5)_4$) and oxygen, or a mixture of disilane and ammonium.

Next, a semiconductor film 1 made of an amorphous silicon film and having a thickness of 30 nm to 100 nm is formed on the entire surface of the substrate 10' by plasma CVD under conditions where the substrate temperature is 150° C. to 450° C. In this case, for example, disilane and monosilane may be used as material gases. Subsequently, the semiconductor film 1 is subjected to laser annealing by being irradiated with laser light. As a result, the amorphous semiconductor film 1 is melted, and is crystallized through cooling and solidification processes. Since the irradiation time of the regions irradiated with the laser light in this case is quite short, and the regions to be irradiated are local with respect to the entirety of the substrate, all the regions of the substrate will not be simultaneously heated to a high temperature. For this reason, even when a glass substrate or the like is used as the substrate 10', it will not be subjected to deformation, cracking, or the like due to heat.

Next, an island-shaped semiconductor film 1 (active layer) and a semiconductor film to form a storage capacitance region are separately formed by etching the surface of the semiconductor film 1 by photolithography using resist masks 551, as shown in FIG. 7(B).

Next, a gate insulating film 2 made of a silicon oxide film or the like and having a thickness of 50 nm to 150 nm is formed on the entire surface of the substrate 10' and the surface of the semiconductor film 1, for example, by CVD at a temperature of 350° C. or less. In this case, a mixture of TEOS and gaseous oxygen may be used as the material gas. The gate insulating film 2 used in this case may be a silicon nitride film, instead of the silicon oxide film.

Then, although not shown, a lower electrode to form a storage capacitor 60 between the semiconductor film 1 and a capacitor line 3*b* is formed by implanting impurity ions into an extended portion 1*f* of the semiconductor film 1 via a predetermined resist mask (see FIGS. 4 and 5).

After a conductive film 3 made of a metal film of aluminum, tantalum, molybdenum, or the like, or an alloy film chiefly containing any of these metals, and having a thickness of 300 nm to 800 nm is formed on the entire surface of the substrate 10', for example, by sputtering so as to form a scanning line 3*a* and the like, resist masks 552 are formed by photolithography, as shown in FIG. 7(C).

Subsequently, a scanning line 3*a* (gate electrodes), a capacitor line 3*b*, and the like are formed by subjecting the conductive film 3 to dry etching using the resist masks 552, as shown in FIG. 7(D).

Next, a lightly doped region 1*b* is formed in a self-aligned fashion in relation to the scanning line 3*a* in a pixel TFT portion and an N-channel TFT portion (not shown) of a driving circuit by implanting impurity ions (phosphorus ions) at a dosage of approximately $0.1 \times 10^{13}/cm^2$ to approximately $10 \times 10^{13}/cm^2$ with the scanning line 3*a* and the gate electrodes used as masks. Herein, regions in which impurity ions are not implanted because of their positions just under the scanning line 3*a* serve as channel-forming regions 1*a'*, while the semiconductor film 1 remains unchanged.

Next, as shown in FIG. 8(A), resist masks 553 that are wider than the scanning line 3*a* (gate electrodes) are formed in the pixel TFT portion, and high-concentration impurity ions (phosphorus ions) are implanted therein at a dosage of approximately $0.1 \times 10^{15}/cm^2$ to approximately $10 \times 10^{15}/cm^2$, thereby forming a heavily doped source region 1*a* and a heavily doped drain region 1*d*.

Instead of these impurity implanting processes, a source region and a drain region of an offset structure may be formed by implanting high-concentration impurities (phosphorus ions) while forming resist masks that are wider than the gate electrodes, without implanting low-concentration impurities. Alternatively, a source region and a drain region of a self-aligned structure may be formed by implanting high-concentration impurities with the scanning line 3a used as a mask.

The N-channel TFT portion of a peripheral driving circuit is formed by such processes, and a P-channel TFT portion is covered with a mask in this case, although this is not shown. In order to form the P-channel TFT portion of the peripheral driving circuit, the pixel section and the N-channel TFT portion are covered with a resist for protection, and boron ions are implanted at a dosage of approximately $0.1 \times 10^{15}/cm^2$ to approximately $10 \times 10^{15}/cm^2$ with the gate electrodes used as masks, thereby forming a P-channel source-drain region in a self-aligned fashion.

In this case, a source region and a drain region of an LDD structure (lightly doped drain structure) may be used by forming a lightly doped region in a polysilicon film by the implantation of low-concentration impurities (boron ions) at a dosage of approximately $0.1 \times 10^{13}/cm^2$ to approximately $10 \times 10^{13}/cm^2$ with the gate electrodes as masks, in a manner similar to that in the formation of the N-channel TFT portion, and then implanting high-concentration impurities (boron ions) at a dosage of approximately $0.1 \times 10^{15}/cm^2$ to approximately $10 \times 10^{15}/cm^2$ using masks wider than the gate electrodes. A source region and a drain region of an offset structure may be formed by implanting high-concentration impurities (boron ions) using masks wider than the gate electrodes formed, without implanting low-concentration impurities. These ion implantation processes enable CMOS (Complimentary MOS), and allow the peripheral driving circuits to be incorporated on the same substrate.

As shown in FIG. 8(B), a first interlayer insulating film 4 made of a silicon oxide film or the like and having a thickness of 300 nm to 800 nm is formed on the front side of the scanning line 3a, for example, by CVD. In this case, for example, a mixture of TEOS and gaseous oxygen may be used as the material gas.

Next, a resist mask 554 is formed by photolithography.

Subsequently, the first interlayer insulating film 4 is subjected to dry etching through the resist mask 554, and contact holes are thereby formed in portions of the first interlayer insulating film 4 corresponding to the source region and the drain region, as shown in FIG. 8(C).

Next, as shown in FIG. 8(D), a conductive film 6 made of an aluminum film, a titanium film, a titanium nitride film, a tantalum film, a molybdenum film, or an alloy film chiefly containing any of these metals, and having a thickness of 300 nm to 800 nm is formed on the front side of the first interlayer insulating film 4, for example, by sputtering so as to form a data line 6a (source electrode) and the like, and a resist mask 555 is then formed by photolithography.

Next, as shown in FIG. 9(A), a data line 6a and a drain electrode 6b are formed by subjecting the conductive film 6 to dry etching through the predetermined resist mask 555.

As shown in FIG. 9(B), a second interlayer insulating film (surface-protecting film) 5 made of a single film, such as a silicon nitride film or a silicon oxide film, or two films, that is, a silicon nitride film and a silicon oxide film, and having a thickness of approximately 100 nm to 300 nm is formed on the first interlayer insulating film 4 by CVD (the second interlayer insulating film 5 may be omitted).

As shown in FIGS. 10(A) and 10(B), after an organic photosensitive resin 13a, such as acrylic resin, and having a thickness of 1 µm to 3 µm is applied on the surface of the second interlayer insulating film (surface-protecting film) 5 by spin coating, it is patterned by photolithography, thereby forming a surface-irregularities forming layer 13 of 1 µm to 3 µm in thickness under a reflective electrode 8, which will be described below. Subsequently, a baking process may be performed to perform smoothing.

While the photosensitive resin 13a used to form the surface-irregularities forming layer 13 by such photolithography may be of a negative type or a positive type, FIG. 10(A) shows a case in which the photosensitive resin 13a is of a positive type, and the portions of the photosensitive resin 13a to be removed are irradiated with ultraviolet rays through light-transmitting portions of a predetermined exposure mask.

As shown in FIG. 10(C), an organic photosensitive resin 7a, such as acrylic resin, having a thickness of 1 µm to 2 µm is formed on the front sides of the second interlayer insulating film (surface-protecting film) 5 and the surface-irregularities forming layer 13 by spin coating.

As shown in FIG. 10(D), an uneven layer 7 of 1 µm to 2 µm is formed by photolithography so that a portion thereof is opened to reach the surface of the second interlayer insulating film (surface-protecting film) 5 (this portion finally forms a contact hole 15).

Since the uneven layer 7 is formed by applying a fluid material, an edgeless and smooth uneven pattern is formed on the surface of the uneven layer 7 so as to moderately remove the irregularities of the surface-irregularities forming layer 13.

When a smooth uneven pattern is formed without forming the uneven layer 7, the edges of the surface-irregularities forming layer 13 may be smoothened by performing a baking process in a state shown in FIG. 10(B).

Next, as shown in FIG. 11(A), a contact hole 15 is formed by removing the second interlayer insulating film (surface-protecting film) 5 by dry etching using the uneven layer 7 as a mask so that a transparent electrode 9, which will be described below, and the drain electrode 6b can be electrically connected.

As shown in FIG. 11(B), a metal film 8a having a thickness of 50 nm to 200 nm and a reflectivity like the above-described aluminum film or the like is formed, for example, by sputtering.

As shown in FIG. 11(C), a reflective plate 8 having an opening 14 is formed by selectively removing a portion between pixel portions next to the opening 14 by micromachining.

As shown in FIG. 11(D), an ITO film 9a of approximately 50 nm to 200 nm in thickness is formed, for example, by sputtering.

Next, as shown in FIG. 11(E), a transparent electrode 9 having a predetermined pattern is formed by photolithography and etching. In this case, it is preferable that the transparent electrode 9 be formed over a wider area than the area in which the reflective plate 8 is formed. In this way, the transparent electrode 9 and the drain electrode 6b are electrically connected. An uneven pattern 8g having a thickness of 500 nm or more, or 800 nm or more, is formed of the irregularities made by the surface-irregularities forming layer 13 and the uneven layer 7 on the surfaces of the reflective plate 8 and the transparent electrode 9 thus formed, and the uneven pattern 8g is made edgeless and smooth by the uneven layer 7.

After that, an alignment film (polyimide film) 12 is formed on the front side of the transparent substrate 9. For that purpose, a polyimide varnish in which 5 to 10 weight percent polyimide or polyimide acid is melted in a solvent such as butyl cellosolve or n-methylpyrrolidone is subjected to flexography, and is set (baked) by heating. Then, the substrate with the polyimide film thereon is rubbed with a fabric puff made of rayon fibers in a fixed direction so that the polyimide molecules are aligned in a fixed direction adjacent to the surface (subjected to rubbing). As a result, liquid crystal molecules that will be injected later are aligned in a fixed direction by the interaction between the liquid crystal molecules and the polyimide molecules.

The TFT array substrate 10 is completed through the above-described procedure.

While the liquid crystal display devices of the above embodiments are of an active matrix type using a TFT as the pixel switching element, the present invention may be applied to an active matrix liquid crystal display device using a TFD as the pixel switching element, a passive matrix liquid crystal display device, or an electrooptic device using an electrooptic substance other than the liquid crystal (for example, an EL light-emitting element).

Applications of Electrooptic Device to Electronic Devices

While the semi-reflective and semi-transmissive electrooptic device 100 having such a configuration may be used as a display section for various electronic devices, an example thereof will be specifically described with reference to FIGS. 12 to 14.

Figure 12:
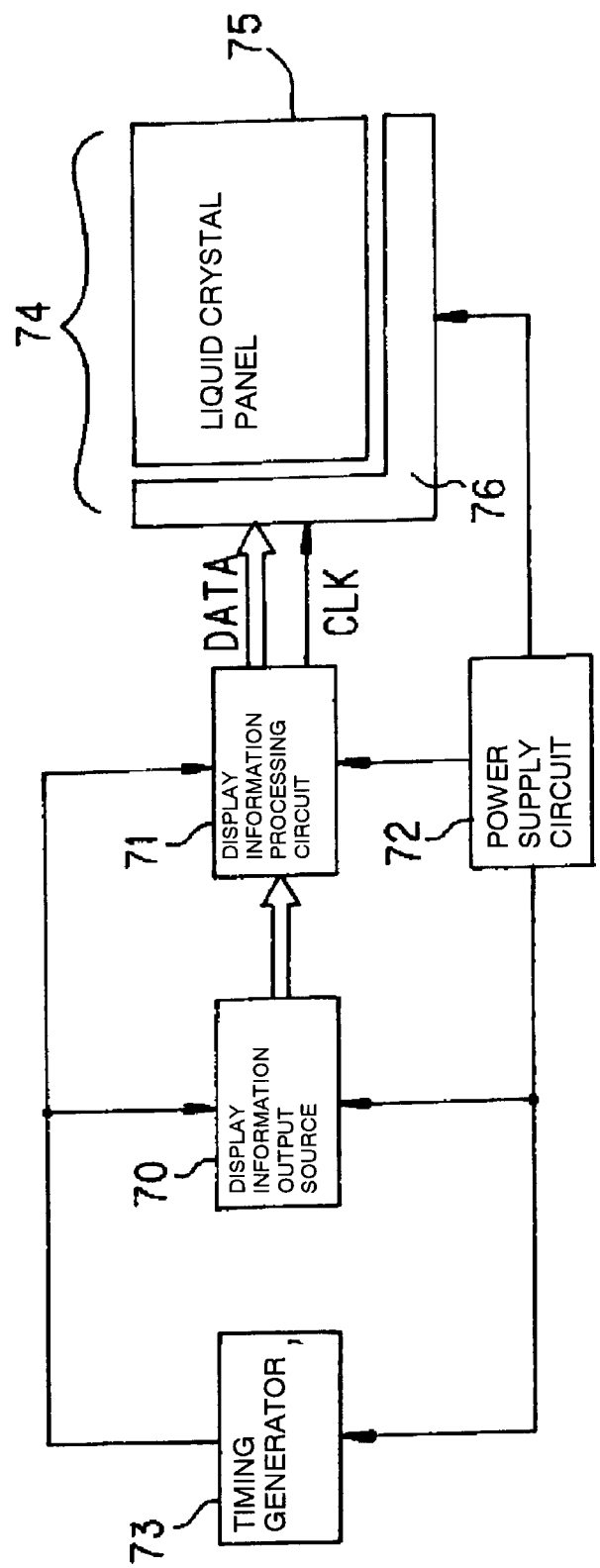
FIG. 12 is a schematic showing the circuit configuration of an electronic device using the electrooptic device of the present invention as a display device.

FIG. 12 is a schematic showing the circuit configuration of an electronic device that uses the electrooptic device of the present invention as a display device.

In FIG. 12, the electronic device includes a display information output source 70, a display information processing circuit 71, a power supply circuit 72, a timing generator 73, and a liquid crystal display device 74. The liquid crystal display device 74 has a liquid crystal display panel 75 and a driving circuit 76. The above-described electrooptic device 100 may be used as the liquid crystal device 74.

The display information output source 70 includes a memory, such as a ROM (Read Only Memory) or a RAM (Random Access Memory), a storage unit, such as various disks, a tuned circuit to output digital image signals in a tuned manner, and the like, and supplies display information, such as a predetermined-format image signal, to the display information processing circuit 71 according to various clock signals generated by the timing generator 73.

The display information processing circuit 71 includes various known circuits, such as a serial-parallel conversion circuit, amplifying and inverting circuits, a rotation circuit, a gamma correction circuit, and a clamp circuit, processes input display information, and supplies an image signal corresponding thereto to the driving circuit 76 with a clock signal CLK. The power supply circuit 72 supplies a predetermined voltage to each component.

Figure 13:
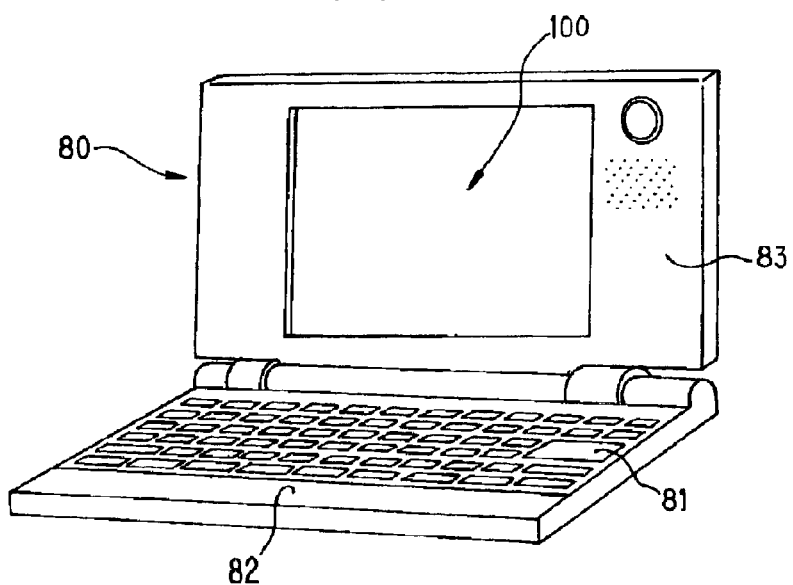
FIG. 13 is a perspective view of a mobile personal computer as an example of an electronic device using the electrooptic device of the present invention.

FIG. 13 shows a mobile personal computer as an electronic device according to an example of the present invention. A personal computer 80 shown herein includes a body section 82 having a keyboard 81, and a liquid crystal display unit 83. The liquid crystal display unit 83 includes the above-described electrooptic device 100.

Figure 14:
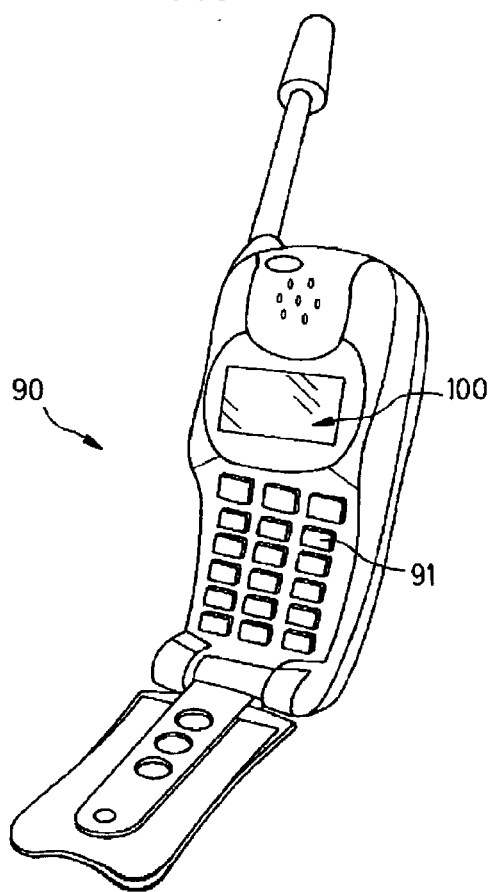
FIG. 14 is a perspective view of a portable telephone as an example of an electronic device using the electrooptic device of the present invention.
Figure 15:
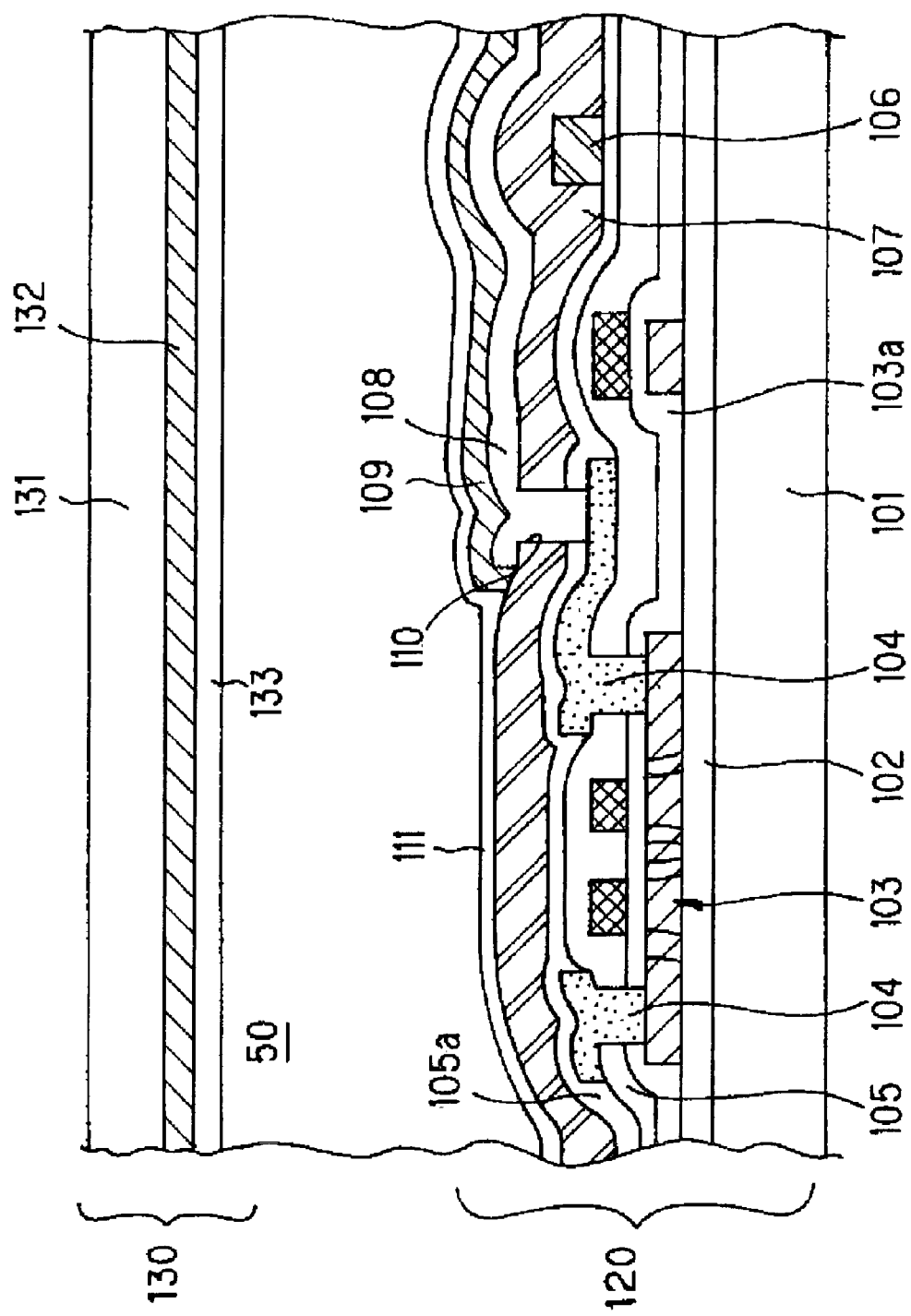
FIG. 15 is a sectional view schematically showing a part of a pixel in a related art electrooptic device.

FIG. 14 shows a portable telephone as another electronic device. A portable telephone 90 shown herein includes a plurality of control buttons 91, and a display section formed of the above-described electrooptic device 100.

ADVANTAGES

As described above, the present invention can provide an electrooptic device which is suitable for use in a portable telephone, a mobile computer, and the like, and in which the effective voltage to be applied to the liquid crystal is high, high-contrast display is possible, and a reflective electrode is prevented from deteriorating, and can provide a production method for the electrooptic device.

What is claimed is:

1. An electrooptic device, comprising:
an electrooptic substance;
a pair of substrates opposing each other so as to seal and hold the electrooptic substance therebetween;
a backlight source;
a reflective plate formed on a side of one of said pair of substrates close to the electrooptic substance, and having at least one opening, each at a predetermined position, to reflect incident light from another of the pair of substrates, and to transmit light from the backlight source;
at least one of a drain electrode and a semiconductor layer; and
a transparent electrode formed on said reflective plate and electrically connected to the at least one of the drain electrode and the semiconductor layer.

2. The electrooptic device according to claim 1, one of said reflective plate and said reflective electrode including a single film of aluminum, silver, or an alloy containing at least one of aluminum and silver, or a composite film formed of the metal or alloy, and titanium, titanium nitride, molybdenum, or tantalum.

3. The electrooptic device according to claim 1, said transparent electrode including an indium tin oxide film.

4. The electrooptic device according to claim 1, an area in which said transparent electrode is formed being wider than an area in which said reflective plate is formed.

5. The electrooptic device according to claim 1, further comprising:
an uneven layer formed under said reflective plate and said transparent electrode, and having surface irregularities,
said reflective plate having an uneven surface that conforms to said irregularities of said uneven layer so as to scatter reflected light.

6. An electrooptic device, comprising:
an electrooptic substance;
a pair of substrates opposing each other so as to seal and hold the electrooptic substance therebetween;
a backlight source;
a reflective electrode formed on a side of one of said pair of substrates close to the electrooptic substance, and having at least one opening, each at a predetermined position, to reflect incident light from another of the pair of substrates, and to transmit light from the backlight source;
at least one of a drain electrode and a semiconductor layer; and
a transparent electrode formed on said reflective electrode, said reflective electrode electrically connected to the at least one of the drain electrode and the semiconductor layer.

7. An electrooptic device production method, comprising:
forming a reflective plate on a side of one of a pair of substrates opposing each other so as to seal and hold an electrooptic substance therebetween, the side being close to the electrooptic substance;
forming at least one opening, each at a predetermined position in said reflective plate, to reflect incident light from another of said pair of substrates and to transmit light from a backlight source;
forming a transparent electrode on said reflective plate so as to cover an area of said reflective plate corresponding to said openings; and
electrically connecting said transparent electrode to at least one of a drain electrode and a semiconductor layer.

8. The electrooptic device production method according to claim 7, further including using a single film of aluminum, silver, or an alloy containing at least one of aluminum and silver, or a composite film formed of the metal or alloy, and titanium, titanium nitride, molybdenum, or tantalum as one of said reflective plate and said reflective electrode.

9. The electrooptic device production method according to claim 7, further including using an indium tin oxide film as said transparent electrode.

10. The electrooptic device production method according to claim 7, the step of forming the transparent electrode including forming an area in which said transparent electrode is formed to be wider than an area in which said reflective plate is formed.

11. The electrooptic device production method according to claim 7, further including a step of:
forming an uneven layer having surface irregularities on said one of said substrates before said step of forming said reflective plate.

12. An electrooptic device production method, comprising:
forming a reflective electrode on a side of one of a pair of substrates opposing each other so as to seal and hold an electrooptic substance therebetween, the side being close to the electrooptic substance;
forming at least one opening, each at a predetermined position in said reflective electrode, to reflect incident light from another one of said pair of substrates and to transmit light from a backlight source;
electrically connecting said reflective electrode to at least one of a drain electrode and a semiconductor layer; and
forming a transparent electrode on said reflective electrode so as to cover an area of said reflective electrode corresponding to said openings.

* * * * *